(12) United States Patent
Ruzich et al.

(10) Patent No.: US 8,677,569 B2
(45) Date of Patent: Mar. 25, 2014

(54) ARTICULATING CLUTCH HOOK SYSTEM

(75) Inventors: Justin L. Ruzich, Mokena, IL (US);
Walter Belchine, III, Plainfield, IL
(US); Joel R. Lee, Peotone, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/468,547

(22) Filed: May 10, 2012

(65) Prior Publication Data

US 2012/0319421 A1 Dec. 20, 2012

Related U.S. Application Data

(60) Provisional application No. 61/497,759, filed on Jun. 16, 2011.

(51) Int. Cl.
*A45C 13/22* (2006.01)
(52) U.S. Cl.
USPC .......... 16/445; 16/444; 16/418; 16/412; 16/438
(58) Field of Classification Search
USPC .......... 16/445, 436, 418, 438, 110.1, 111.1; 296/1.02, 37.7, 37.8, 214
See application file for complete search history.

(56) References Cited

U.S. PATENT DOCUMENTS

| | | | | |
|---|---|---|---|---|
| 6,076,233 A | * | 6/2000 | Sasaki et al. | 16/444 |
| 6,397,435 B1 | * | 6/2002 | Gosselet | 16/438 |
| 6,643,897 B2 | * | 11/2003 | Chang | 16/248 |
| 6,836,932 B2 | * | 1/2005 | Yamamoto et al. | 16/110.1 |
| 7,103,939 B2 | * | 9/2006 | Belchine et al. | 16/412 |
| 7,988,115 B2 | * | 8/2011 | Lee et al. | 248/304 |

FOREIGN PATENT DOCUMENTS

| | | | | |
|---|---|---|---|---|
| JP | 2002234372 A | * | 8/2002 | |
| KR | 2005046947 A | * | 5/2005 | |

* cited by examiner

*Primary Examiner* — Chuck Mah
(74) *Attorney, Agent, or Firm* — Mark W. Croll; Paul F. Donovan

(57) ABSTRACT

A grab handle assembly with integrated articulating hook is disclosed comprising base elements and a handle pivotal on the base elements between closed and an open positions. A pivot pin is fixed to the handle and pivotally supported on a base element. A hook is pivotally supported on the pivot pin and is movable between a stored and a deployed position. In one form a resilient finger on the hook coacts with surfaces on the pivot pin to provide resistance to movement of the hook between the stored and deployed positions. The pin is configured to provide varied resistance at different hook positions.

19 Claims, 4 Drawing Sheets

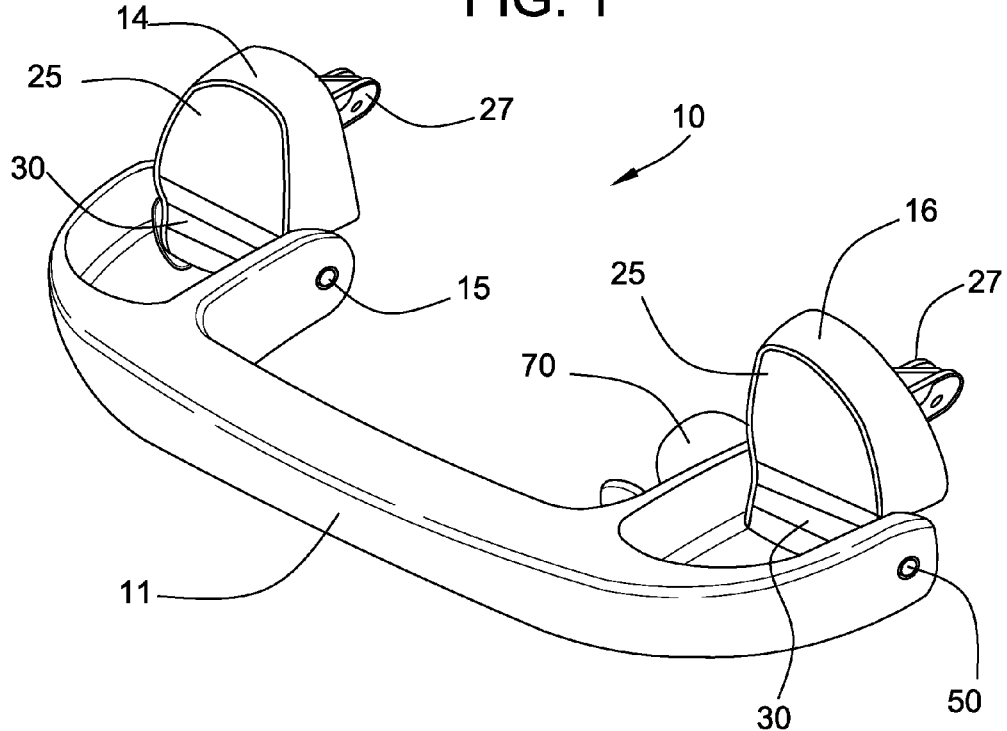
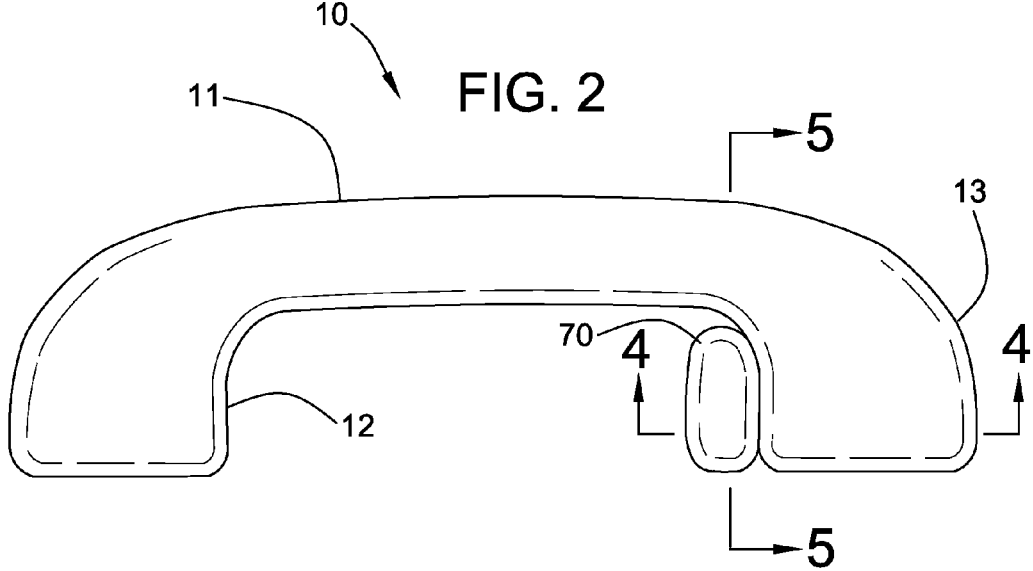

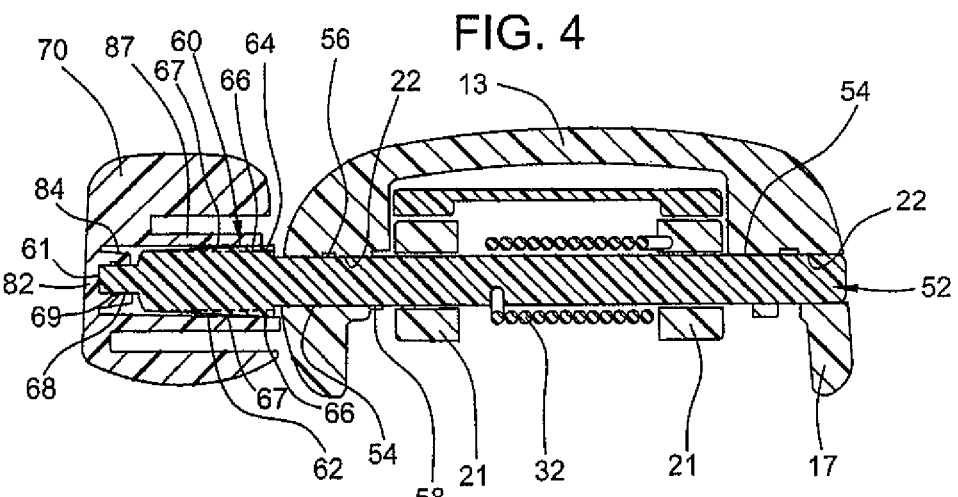
FIG. 4
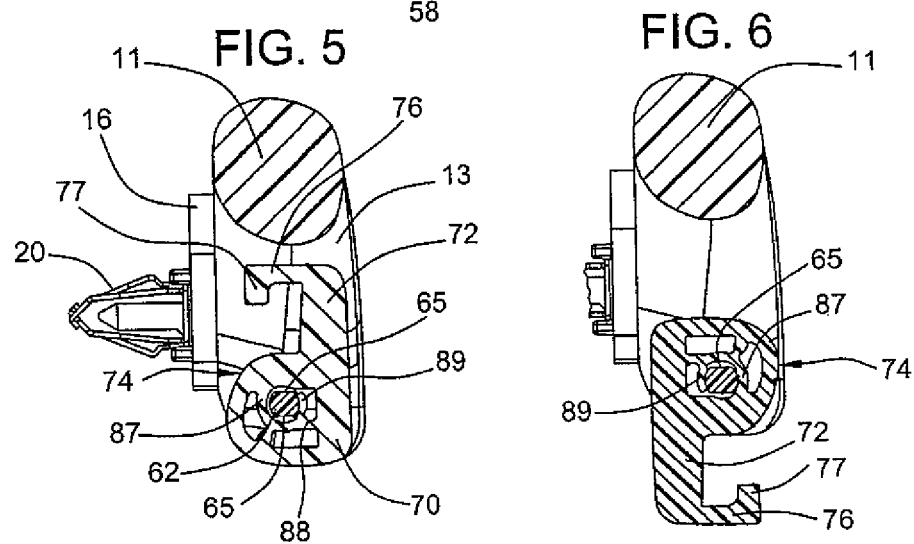
FIG. 5
FIG. 6
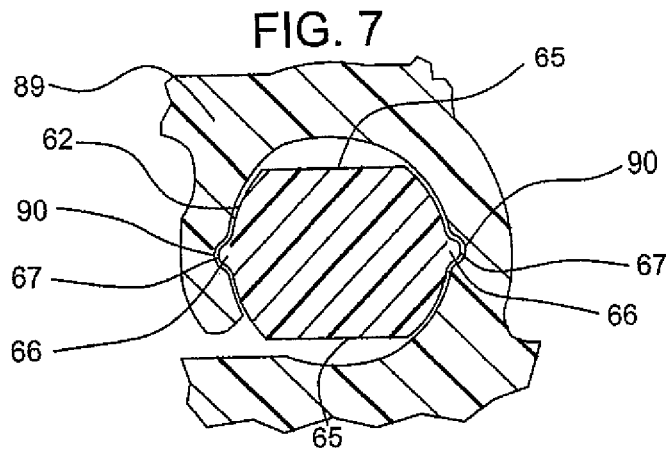
FIG. 7

ARTICULATING CLUTCH HOOK SYSTEM

This application claims priority, pursuant to Title 35 USC Sec. 119(e) to provisional application No. 61/497,759, filed Jun. 16, 2011, the entire specification and drawings of which are hereby incorporated by reference herein.

BACKGROUND

This disclosure relates to an articulating assist hand grip or grab handle assembly for a motor vehicle with an integrated articulating hook. More particularly, it relates to an articulating mechanism for the hook of the assembly.

Articulating grab handles for passenger assist within automotive vehicles and similar conveyances are known. Incorporation of a hook feature for temporarily hanging articles such as clothing within the vehicle are also common.

Usually the grab handles are arranged above the passenger seating area, attached to the vehicle body. They are arranged for articulation between a stored position against the vehicle wall surface, and an open or operative position for easy grasp by a passenger seeking assistance.

The associated hook feature provides a convenient location to hang items such as coats, clothing on hangers or bags with hand grips. Such hooks are also articulated to move from a stored or closed position essentially concealed by the grab handle, to an operative or deployed position where the hook presents for reception of the articles to be supported.

Often these assemblies present complex mechanisms requiring numerous additional components such as special styling cap, internal coil spring, pin lock to fix the hook to the handle assembly and others. Also, the complexities of these prior devices have dictated separate molds for grab handles accommodating the hook feature.

SUMMARY OF THE DISCLOSURE

The present disclosure comprises an arrangement that eliminates these previously undesirable aspects and dramatically simplifies assembly of components. The grab handle is configured for installation and use with, or without the hook feature, making it suitable for installation throughout the vehicle at locations where hand grips are desired. This reduces inventory requirements at OEM assembly as well as speeding the assembly process. The hand grip of this disclosure provides for ready inclusion of the hook feature with minimal modification of the handle grip components for the addition of the hook component. The hook of the present disclosure is a single molded component easily insertable into the handle assembly and fully functional for deployment or storage as desired.

This disclosure comprises a grab handle assembly and articulating hook having a base, a handle pivotal on the base between a closed and an open position, a pivot pin fixed to the handle and pivotally supported on the base, a hook pivotally supported on the pin movable between a stored and a deployed position. In one form, the hook frictionally engages the pivot pin to resist movement between its stored and deployed positions.

DESCRIPTION OF THE DRAWINGS

FIG. 1 is a front perspective view of a complete grab handle assembly with integrated articulating hook of the present disclosure.

FIG. 2 is a front plan view of the grab handle assembly with integrated articulating hook of FIG. 1.

FIG. 4 is a sectional view of the assembly of FIG. 1 taken along the line 4-4 of FIG. 2.

FIG. 5 is a sectional view of a portion of the assembly of FIG. 1 taken along the lines 5-5 of FIG. 2 with the articulating hook in its closed position.

FIG. 6 is a fragmentary sectional view similar to FIG. 5 showing the articulating hook in its deployed position.

FIG. 7 is a fragmentary sectional view on an enlarged scale of the articulating hook and associated pivotal shaft of the assembly of FIG. 1.

DETAILED DESCRIPTION OF ILLUSTRATED EMBODIMENTS

Figure 3:
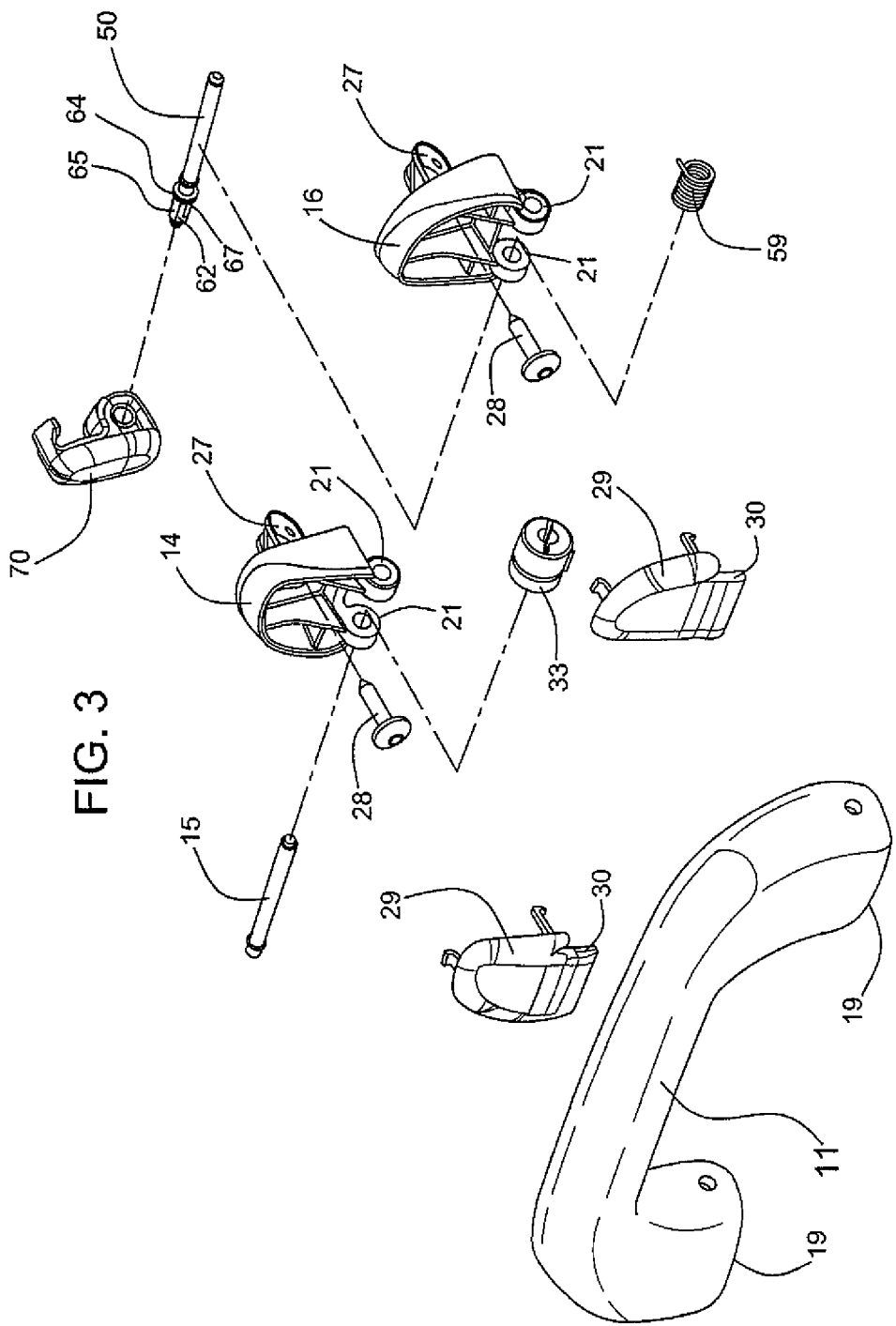
FIG. 3 is an exploded perspective view of the components of the assembly of FIG. 1.

A complete handle assembly, with articulating hook showing the functional rotational movements are depicted in FIGS. 1 to 6. The handle assembly attaches rigidly to a metal bracket behind the headliner of a vehicle, generally over the window near a door opening in automotive vehicle. Several handle assemblies are employed in a vehicle passenger compartment.

The assist grip or grab handle assembly with integrated articulating hook is generally designated 10. It includes an elongate U-shaped handle 11 with a forward leg 12 and a rearward leg 13 pivotally supported upon base elements including forward base 14 and rearward base 16.

In this disclosure, the term forward is intended to mean toward the front of a vehicle in which the grab handle assembly is affixed. Rearward means toward the rear of the vehicle. It should be noted that the terms forward and rearward are relative terms. Since the handle assembly may be installed in a vehicle on either side of the passenger compartment, the forward leg 12 of an assembly 10 mounted on one side of the vehicle would be the rearward leg 13 if mounted on the other side of the vehicle. Axial means along a longitudinal axis, for example, of an illustrated pivot pin. Radial means in a direction perpendicular to the longitudinal axis.

A pivot pin 15 supports the forward leg 12 of the handle 11 on forward base 14. A pivot pin 50, configured for acceptance and retention of a support hook, supports rearward leg 13 of handle 11 on rearward support base 16. As seen in FIG. 2, support hook 70 is pivotally supported by pivot pin 50 on rearward base 16 within the U shape of the handle 11. It should be noted that the handle 11 and base elements 14 and 16 are useful as a grab handle assembly without an articulating hook. In such an assembly, two pivot pins 15 would be used to pivotally support the handle 11 on the base elements.

Forward base 14 and rearward base 16 are arranged to be secured to the body of the vehicle with expansion clips 27. The vehicle includes appropriate receptacles to receive the expansion clips 27 during the vehicle interior assembly. Clips 20 are expanded by insertion of drive pins 28. After insertion of pins 28 base elements 14 and 15 receive "snap-on" decorative covers 29 to provide a finished exterior appearance. The covers include abutment portions 30 at their lower edges which limit pivotal movement of the handle 11.

Grab handle 11 is pivotally supported on base 14 and base 16 by pivot pins 15 and 50. Each base defines spaced journals 21 best seen in FIG. 3 with aligned bores to receive and pivotally support pins 15 or 50. The leg portions 12 and 13 of elongate grab handle 11 define parallel walls 17, best seen in FIG. 4 arranged to overlie the spaced journals 21 of bases 14 and 16. Walls 17 include bores 22 aligned with the bores of spaced journals 21 of base 14 and base 16 for installation of pivot pins 15 and 50.

Handle 11 is manually pivotal between a closed or stored position seen in FIG. 2 and an open or operative position seen in FIG. 1 where it extends generally horizontally outward from the base members for use. The pivotal extent of movement between the stored and open or operative positions is approximately ninety degrees (90°). Legs 12 and 13 include bottom edges 19 that abut abutment portions 30 of decorative covers 29 to limit pivotal movement of handle 11 at its operative position.

A coil spring 32 illustrated in FIGS. 3 and 4 is disposed between journals 21 and surrounds pivot pin 50. It includes one end connected to handle 11 and another end connected to rearward base 16. It is pre-loaded such that it urges handle 11 to pivot about journals 21 to its stored or closed position seen in FIG. 2.

As seen in FIG. 3, this assembly 10 may include a dampener element 33 connected between forward base 14 and forward leg 12 of handle 11 to dampen the movement of the handle between its open or operative and stored positions. Dampener 33 provides a smooth and controlled resistance to the manual manipulation process and provides a controlled return to the closed position by coil spring 32.

Support hook 70 is supported within the U-shaped curve of the handle 11 upon the pivot pin 50 that supports the rearward leg 13 of handle 11 on the rearward base 16. The hook 70 is pivoted between a closed position and an operative or deployed position. When stored, the hook 70 is concealed within the U shape of the handle 11. It is essentially vertically disposed. In the deployed position, it extends downward to receive an article to be supported. As illustrated in FIGS. 5 and 6, the arc of pivotal movement between the closed position and the operative or deployed position is approximately one hundred eighty degrees (180°).

Pivot pin 50 is specially configured to pivotally receive support hook 70. Best seen in FIGS. 3 and 4, the pin 50 is longitudinally elongate between a rearward end portion 52 and a forward end portion 60. The pin includes a cylindrical surface 54 extending forward from rearward end portion 52. It is sized to make an interference fit with the bores 22 in walls 17 of rear leg 13 of handle 11. The bores in journals 21 are sized to permit the pin 50 to freely pivot relative to rearward base 16. Similarly, pivot pin 15 is fixed in appropriate bores in handle forward leg 12 by interference fit and pivotal in the bore of journals 21 of forward base 14.

Pin 50 may include radial ribs 56 that engage within the bores 22 in forward wall 17 of rear leg 13 to ensure a positive engagement between pin 50 and handle 11 such that relative pivotal movement occurs only between pin 50 and journals 21 of rearward base 16. Pin 50 may also include radially directed ramps 58 to assist in passage of the pin 50 through the bore 22 in wall 17 on insertion of the pin 50 to secure handle 11 to rearward base 16. Ramps 58 also resist withdrawal of pin 50 from its interference fit connection in bore 22 of forward wall 17 of leg 13.

Turning to FIG. 4 and the pivot pin 50 as there illustrated, forward end portion 60 extends into the space between the leg portions 12 and 13 of handle 11. Forward end portion 60 includes an elongate generally cylindrical portion 62 having a diameter larger than the cylindrical surface 54. Generally cylindrical portion 62 also defines radial abutment 64 at an end toward cylindrical surface 54.

Best seen in FIG. 4, generally cylindrical portion 62 includes parallel flats 65 positioned one hundred eighty degrees (180°) apart. Thus, the outer surface of generally cylindrical portion 62 is interrupted by diametrically opposed flats 65 creating voids in an otherwise cylindrical configuration. Generally cylindrical portion 62 also includes a pair of diametrically opposed upstanding ribs 66 positioned one hundred eighty degrees (180°) apart. The ribs define radial outward sloped surfaces 67 diverging away from end 61 toward radial abutment 64.

Referring to FIG. 4, the forward end portion 60 terminates at forward end 61 of pivot pin 50 in a cylindrical journal portion 68 having a diameter smaller than cylindrical surface 54. Cylindrical journal portion 68 includes an annular radial outward ring 69 spaced rearward from the forward end 61 of pin 50.

Integrated hook 70 is a unitary molded plastic component. In fact, all of the components of the assembly 10, with the exception of spring 32, clips 27 and pins 28 may be made of molded plastic.

Best seen in FIGS. 4 to 6, hook 70 includes a main body portion 72, a journal portion 74, and a hanger portion 76. Hook 70 is pivotally supported on forward end portion 60 of pivot pin 50. It is movable between a closed or stored position seen in FIGS. 1, 2 and 5 and an operative or deployed position seen in FIG. 6. In the closed position, main body portion 72 is generally vertical and disposed within the void of the U-shaped handle 11 adjacent rear leg 13. In this position, hanger portion 76 extends toward the interior surface of the vehicle and is essentially concealed.

In the operative or deployed position, main body portion 72 is pivoted relative to pivot pin 50 about one hundred eighty degrees (180°). Because of the length of main body portion 72 in the deployed position, the hanger portion 76 is positioned below the pivot pin 50 for ready access to the user. The hanger portion 76 is generally horizontal and exposed toward the interior of the vehicle. A barb 77 extends vertically from hanger portion 76 to restrict slippage of secured items.

Best seen in FIGS. 5 and 6, journal portion 74 of hook 70 is configured to retain the hook on pivot pin 50 and to releasably pivot on cylindrical journal portion 68 of pivot pin 50 between the closed and deployed positions. Journal portion 74 defines a bore open at its rearward end and closed at its forward end by a wall 82. It defines cylindrical bushing 84 seen in FIG. 4 that extends rearward from wall 82. It includes a bore sized to receive cylindrical journal portion 68 of pivot pin 50 to journal hook 70 on the cylindrical journal portion 68 of forward end portion 60. The bore in bushing 84 includes internal counterbore to receive radial ring 69 of pivot pin 50.

As best seen in FIGS. 4 and 7, the interior of journal portion 74 of hook 70 includes a web positioned to surround the generally cylindrical portion 62 of pivot pin 50. The web comprises an arcuate segment 87 supported by molded ties 88. The arcuate segment 87 defines an internal arcuate surface that rides on diverging sloped surfaces 67 on upstanding ribs 66 on generally cylindrical portion 62 of pivot pin 50.

A resilient finger 89 extends from arcuate segment 87. The space between the interior surface of resilient finger 89 and the internal arcuate surface of arcuate segment 87 is less than the diameter across the diverging sloped surfaces 67 on upstanding ribs 66 on cylindrical portion 66 at the location of contact with the arcuate segment 87 and the resilient finger 89. Thus, the finger 89 is somewhat flexed, or deflected from its nominal or unstressed position causing it to apply a force against diverging surfaces 67 on upstanding ribs 66 on generally cylindrical portion 62 of pivot pin 50. The frictional engagement between the outer surfaces 67 of ribs 66, arcuate segment 87, and resilient finger 89 provides a resistance to pivotal movement of hook 70 to control the manipulation function of the hook 70 between its stored and deployed positions.

Best seen in FIG. 7, arcuate segment 87 and resilient fingers 89 include recesses or slots 90. Slots 90 are disposed one hundred eighty degrees (180°) apart and are sized to releasably engage with upstanding ribs 66 on generally cylindrical portion 62. This engagement provides a firm, but releasable grasp of the hook 72 to pivot pin 50 in the closed, or retracted position and the open or deployed position.

The maximum deflection of finger 89 occurs when the sloped surfaces 67 of ribs 66 on generally cylindrical portion 62 are disposed between the internal arcuate surface of arcuate segment 87 and resilient finger 89. Pivot pin 50 is oriented relative to handle 11 such that this relationship exists when hook 70 is in the stored or closed position and when it is in the operative or deployed position.

As seen in FIG. 4, when the hook 70 is in the closed position, and when it is in the operative or deployed position, finger 89 is deflected a maximum amount, and the effect of the coaction between the surfaces 67 on ribs 66, arcuate segment 87 and resilient finger 89 is maximized. Also, ribs 66 are releasably engaged within recesses 90 in arcuate segment 87 and resilient fingers 89. This relationship provides maximum resistance to pivotal movement of the hook 70 relative to pin 50 releasably latching hook 70 in either the closed or the deployed positions. In between those arcuate positions of hook 70 the effective dimension across generally cylindrical portion of the pin 50 is somewhat reduced thereby reducing the frictional drag or resistance to movement. When the hook 70 is between the closed and deployed positions, and one of the flats 65 on generally cylindrical portion 62 aligned with the finger 89, the finger 89 is in only a slightly deflected condition. Thus, when the hook 70 is between its closed and deployed positions, it becomes easier to pivot relative to pin 50 but with some slight resistance to pivotal movement to provide a confident feel to movement of the hook 70 by the user.

Hook 70 is made of rigid plastic. This material is sufficiently flexible to permit assembly of hook 70 onto forward end portion 60 of pivot pin 50 by urging cylindrical journal portion 68 of pin 50 into the bore in cylindrical bushing 84 until ring 69 snaps into the counterbore within the bore of bushing 84. On such insertion, divergent sloped surfaces 67 on upstanding ribs 66 deform resilient finger 89 relative to arcuate segment 87 to permit complete insertion of cylindrical portion 66 of pin 50 into the cylindrical bushing 84. The restoring force of deformed or deflected resilient finger 89 creates the friction and resistance relationship between the hook 70 and pivot pin 50.

When hook 70 is attached to pin 50 it is free to rotate or pivot on cylindrical journal portion 68 of pin 50. It is affixed to pin 50 because radial ring 69 within the counterbore in bushing 84 prevents axial separation. The spacing of finger 87 relative to the outer surface of ribs 66 of cylindrical portion 66 is such that pivotal movement occurs with a slight drag or resistance to provide a desirable "feel" to the user of hook 70.

Notably, hook 70 is pivotal between its closed position and deployed position without movement of pivot pin 50. Hence handle 11 remains in its stored position. When handle 11 is moved between its stored and open positions, hook 70 moves with pin 50 and remains in its closed position within the space between legs 12 and 13 of handle 11.

Figure 8:
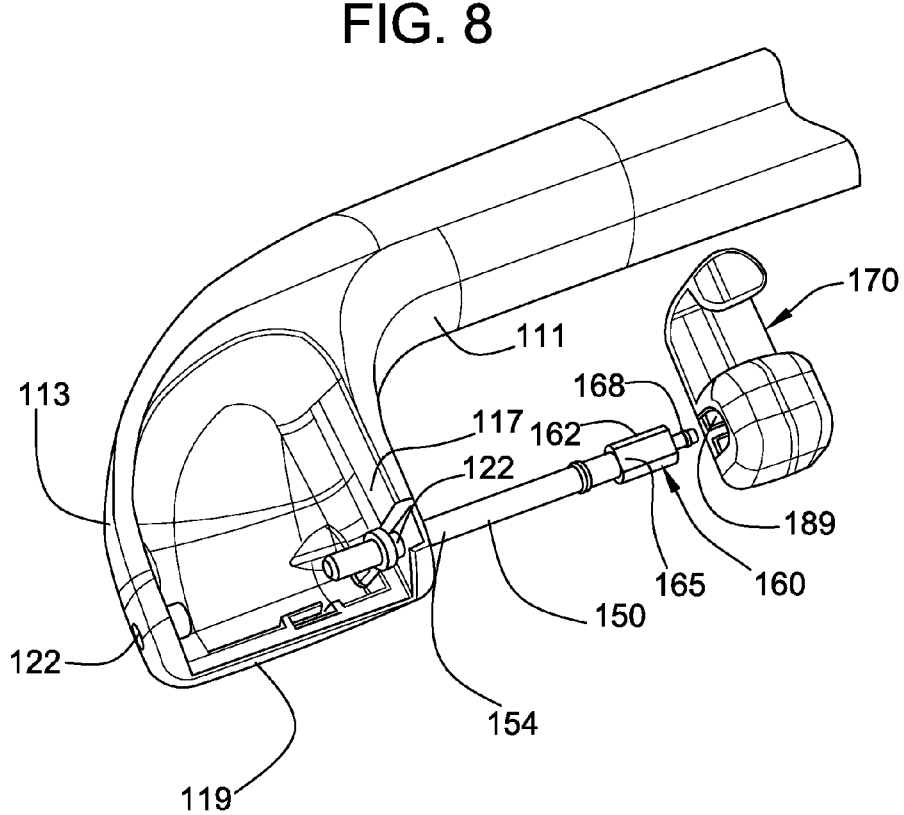
FIG. 8 is a partial rear perspective view of a handle assembly with integrated pivotal hook illustrating a slightly modified form.
Figure 9:
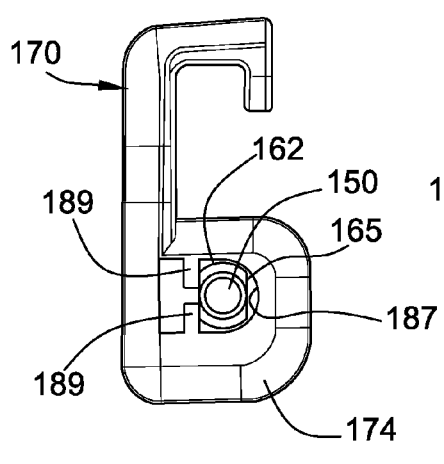
FIG. 9 is a plan view of the pivotal hook of the embodiment of FIG. 8 showing the hook in its closed position.
Figure 10:
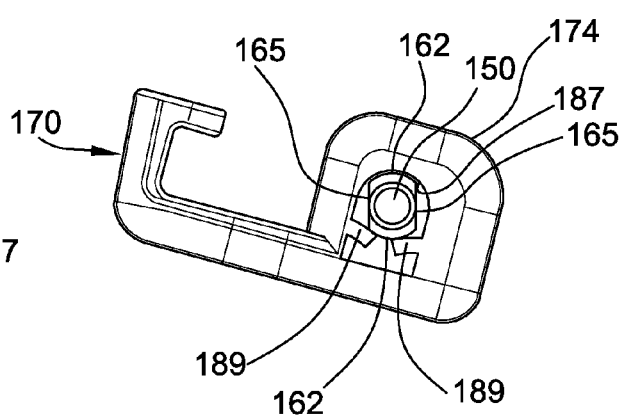
FIG. 10 is a plan view of the pivotal hook of the embodiment of FIG. 8 showing the hook in another position.

FIGS. 8, 9 and 10 illustrate a slightly modified configuration of a grab handle 111 with integrated articulating hook 170 associated with a pivot pin 150, such as the pivot pin 50 of FIGS. 1 to 4. Handle 111 includes a rear leg 113, shown in rear view in FIG. 8, with walls 117 defining bores 122 to receive pivot pin 150. Leg 113 includes a lower edge 119 to abut with an associated base (not shown) to limit pivotal movement of the handle 111 in its operative, or open position.

Pivot pin 150 includes a cylindrical surface 154 to be pivotally supported in appropriate journals in a base (not shown). Surface 154 is sized for interference fit within bore 122 of forward wall 117 of leg 113 such that pin 150 is pivotal relative to the base but fixed relative to handle 111.

The forward end 160 of pin 150 in configured similarly to the forward end 60 of pin 50 of the embodiment of FIGS. 1 to 7. It includes a cylindrical journal portion 168 to receive, retain, and pivotally support hook 170. It further includes a generally cylindrical portion 162 with diametrically opposed flats 165 to coact with the interior configuration of hook 170 to provide a resilient frictional resistance to pivotal movement of hook 170 in the manner of the embodiment of FIGS. 1 to 7.

Hook 170 includes a bushing similar to bushing 84 of the embodiment of FIGS. 1 to 7 to pivotally support and retain hook 170 upon cylindrical journal portion 168 of pivot pin 150.

The interior of journal portion 174 of hook 170 defines an arcuate segment 187 surrounding the generally cylindrical portion 162 of pivot pin 150 with flats 165. A pair of resilient fingers 189 extend from arcuate segment 187. The space between the interior surface of resilient fingers 189 and the internal arcuate segment 187 is about the same as the distance from a flat 165 in contact with fingers 189 to the internal arcuate surface of segment 187. Thus, when the fingers 189 are aligned with the flat 165, the fingers are only slightly stressed. Pivotal movement of hook 170 causes the fingers to deform as the fingers engage generally cylindrical journal portion 162. The maximum deflection of fingers 189 occurs when the generally cylindrical journal portion 162 is disposed between the internal arcuate surface of arcuate segment 187 and resilient fingers 189.

Pivot pin 150 is oriented relative to handle 111 such that when hook 170 is in the stored position, and when it is in the operative or deployed position, fingers 189 are aligned with one of the flats 165. This relationship insures retention of hook 170 in the stored or deployed positions relative to pin 150. The rotational movement between the stored and deployed positions is 180 degrees.

Pivotal movement of hook 170 experiences the most resistance when a user moves it from the stored position or deployed position since this movement requires deflection of fingers 189 as they engage generally cylindrical journal surface 162.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain he best modes known for practicing the invention and will enable others skilled in the art to utilize the invention. The claims are to be construed to include alternative embodiments to the extent permitted by the prior art.

The invention claimed is:

1. A grab handle assembly with articulating hook comprising:

a base;

a handle supported on said base pivotal between a closed position and an open position;

a pivot pin fixed to said handle and pivotally supported on said base;

a hook pivotally supported on said pivot pin movable between a stored position and a deployed position;

wherein said pivot pin includes a forward end portion extending from said handle having a cylindrical journal portion, and said hook includes a journal portion having a bushing defining a bore and wherein said bore is pivotally supported on said cylindrical journal portion of said pivot pin and wherein said cylindrical portion of said forward end portion of said pivot pin includes a radial ring extending from said cylindrical journal portion and said bore defined by said bushing of said journal portion of said hook includes an internal counterbore, and said radial ring of said pivot pin is disposed in said internal counterbore of said bore defined by said bushing of said journal portion of said hook.

2. A grab handle assembly with articulating hook comprising:

a base;

a handle supported on said base pivotal between a closed position and an open position;

a pivot pin fixed to said handle and pivotally supported on said base;

a hook pivotally supported on said pivot pin movable between a stored position and a deployed position;

wherein said pivot pin includes a generally cylindrical portion, and said hook includes a journal portion including a web surrounding, and frictionally engaging at least a part of said generally cylindrical portion of said pivot pin;

wherein said web of said journal portion of said hook includes an arcuate segment and a resilient finger frictionally engaging said generally cylindrical portion of said pivot pin.

3. A grab handle assembly as claimed in claim 2, wherein said base includes a journal defining a bore, and wherein said handle is generally U-shaped and defines a pair of spaced legs; and said pin is fixed to one of said legs and pivotally supported in said bore of said journal of said base.

4. A grab handle assembly as claimed in claim 3, wherein said leg fixed to said pin includes a wall defining a bore and said pivot pin is fixed in said bore of said wall of said leg of said handle.

5. A grab handle assembly as claimed in claim 4 wherein said handle assembly includes an additional base and the other leg of said handle is pivotally supported on said additional base.

6. A grab handle assembly as claimed in claim 5 wherein said leg fixed to said pin includes said wall defining a bore and said pivot pin is fixed to said wall by interference fit of said pivot pin with said bore in said wall, and said hook is disposed between said legs.

7. A grab handle assembly as claimed in claim 6 wherein said assembly includes a coil spring, said spring including an end connected to said additional base and an end connected to said handle urging said handle to said closed position.

8. A grab handle assembly as claimed in claim 2 wherein said generally cylindrical portion of said pivot pin includes a pair of upstanding diametrically opposed upstanding ribs, and at least one of said arcuate segments and resilient finger of said journal portion of said hook includes a recess frictionally engageable with at least one of said upstanding ribs.

9. A grab handle assembly as claimed in claim 8 wherein said arcuate segment and said resilient finger of said web each include a recess frictionally engageable with one of said upstanding ribs.

10. A grab handle assembly as claimed in claim 9 wherein said generally cylindrical portion of said pivot pin includes diametrically opposed flats interposed between said diametrically opposed ribs.

11. A grab handle assembly as claimed in claim 9 wherein said diametrically opposed ribs on said generally cylindrical portion are disposed relative to said pivot pin such that said recess on resilient finger contacts one of said ribs when said hook is in said closed position and the other of said ribs when said hook is in said deployed position.

12. A grab handle assembly as claimed in claim 11 wherein said assembly includes a forward base and a rearward base, said handle includes a forward leg and a forward pivot pin pivotally supported on said forward base, and said rearward leg is pivotally supported on said rearward base by said pivot pin pivotally supporting said hook.

13. A grab handle assembly as claimed in claim 12 wherein said rearward leg includes said wall defining a bore with said pivot pin pivotally supporting said hook is fixed to said wall of said rearward leg by interference fit of said pivot pin with said bore in said wall, and wherein said assembly includes a coil spring, said spring including an end connected to said rearward base and an end connected to urge said handle to said closed position.

14. A grab handle assembly as claimed in claim 8 wherein said generally cylindrical portion of said pivot pin includes diametrically opposed flats interposed between said diametrically opposed ribs.

15. A grab handle assembly as claimed in claim 8 wherein said diametrically opposed ribs on said generally cylindrical portion are disposed relative to said pivot pin such that said resilient finger contacts one of said ribs when said hook is in said closed position and the other of said ribs when said hook is in said deployed position.

16. A grab handle assembly as claimed in claim 2 wherein said generally cylindrical portion of said pivot pin includes diametrically opposed flats to coact with said arcuate segment and said resilient fingers.

17. A grab handle assembly as claimed in claim 2, wherein said base includes a journal defining a bore, and wherein said handle is generally-shaped and defines a pair of spaced legs; and said pin is fixed to one of said legs and pivotally supported in said bore of said journal of said base.

18. A grab handle assembly as claimed in claim 2, wherein said leg fixed to said pin includes a wall defining a bore and said pivot pin is fixed in said bore of said wall of said leg of said handle wherein said handle assembly includes an additional base and the other leg of said handle is pivotally supported on said additional base, and wherein said generally cylindrical portion of said pivot pin includes diametrically opposed flats to coact with said arcuate segment and said resilient finger.

19. A grab handle assembly as claimed in claim 2 wherein said interior journal portion of said hook includes a pair of resilient fingers extending from said arcuate segment.

* * * * *